Figure 1:
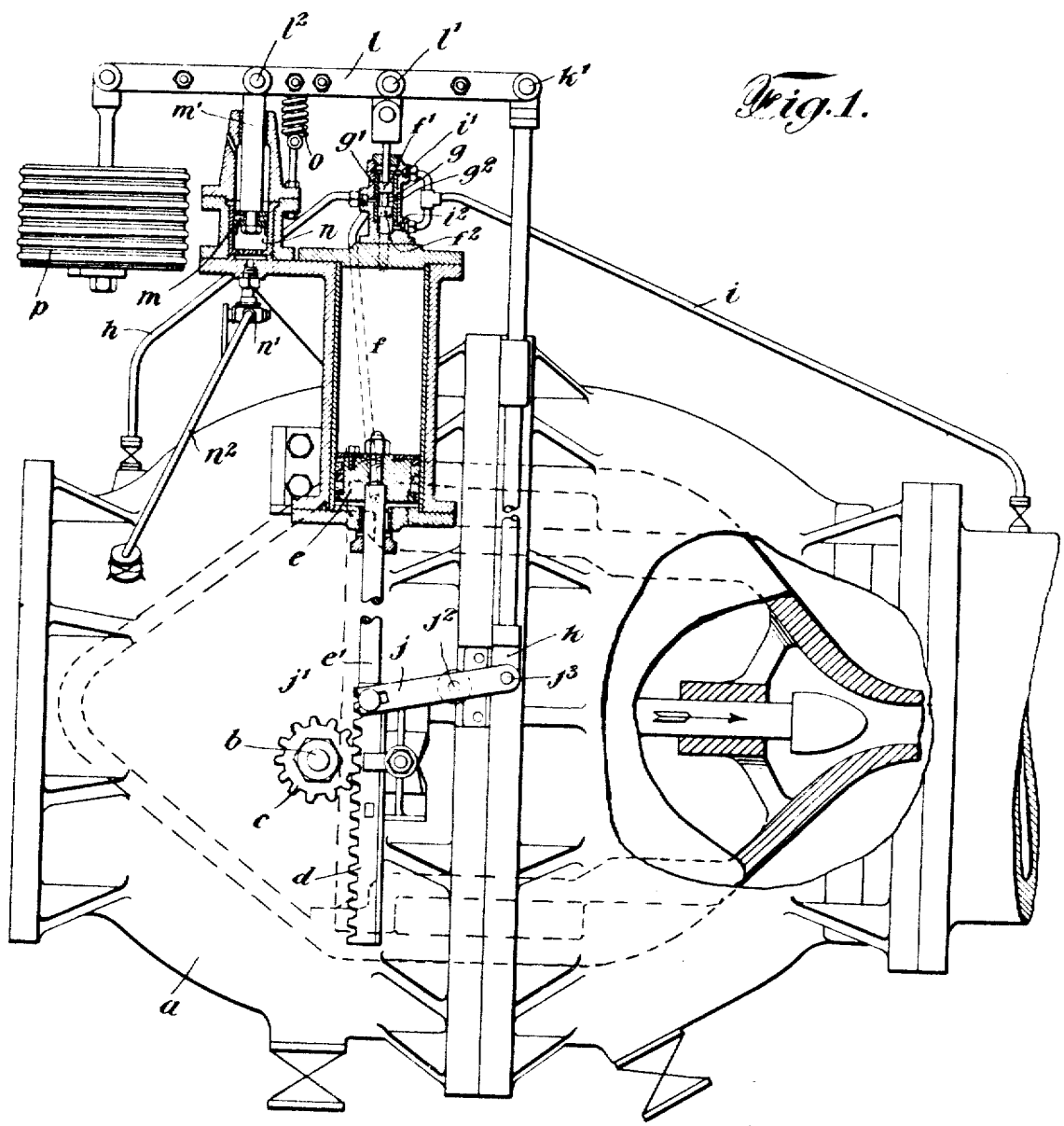

July 1, 1930.  F. A. KLOUMAN  1,769,845
CONTROL MEANS FOR VALVES
Filed May 28, 1926   2 Sheets-Sheet 1

Inventor
F. A. Klouman
By his Attorneys
Edwards, Sager and Bower

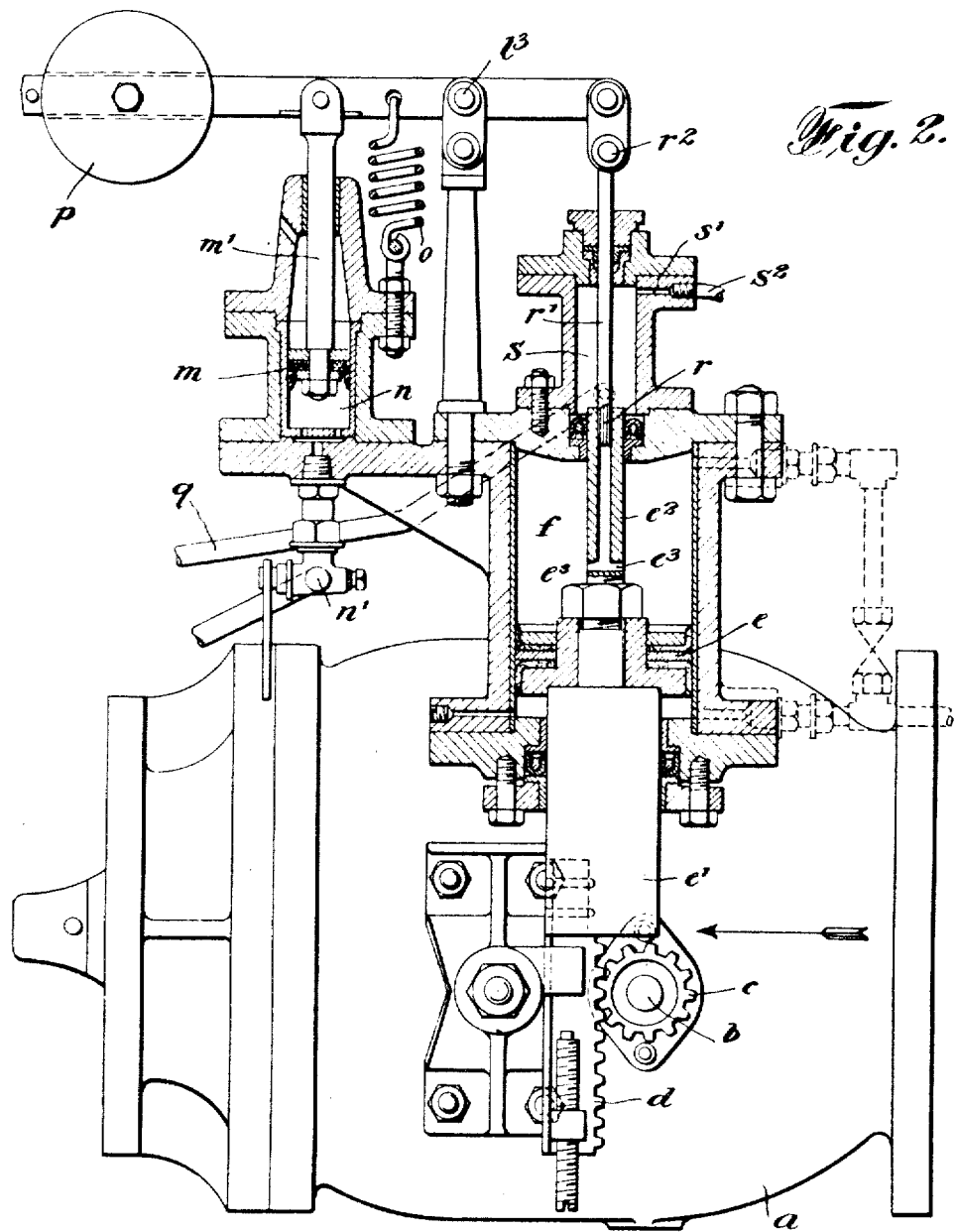

Patented July 1, 1930

1,769,845

UNITED STATES PATENT OFFICE

FREDRICK AUGUST KLOUMAN, OF BRIGHOUSE, ENGLAND, ASSIGNOR, BY MESNE ASSIGNMENTS, TO I. P. MORRIS CORPORATION, A CORPORATION OF DELAWARE

CONTROL MEANS FOR VALVES

Application filed May 28, 1926. Serial No. 112,231.

This invention relates generally to control mechanism for fluid conduit valves, particularly hydraulically operated valves for hydraulic conduits of moderate or large size.

While my invention is applicable to the control of various types of valves it is particularly adapted for valves of the type in which a hollow plunger, working in an internal cylinder in a casing, has a tapered nose adapted to seat itself upon a contracting part of the casing to shut off flow, operation of the plunger being effected either by placing the interior of the cylinder and plunger into communication with the liquid in the pipe line and providing in the plunger nose an aperture controlled by a pilot valve, or by forming between the plunger and the cylinder in which it works an annular chamber to or from which pressure liquid is admitted or exhausted, according as an opening or a closing movement of the plunger is desired.

The invention has for its object the provision of improved control means whereby a valve may be enabled to function as a reducing valve and maintain the pressure in the pipe line on the downstream side of the valve at a determined amount below that existing on the upstream side of the valve or alternatively, by appropriate arrangement of said control means, to enable a valve to function as a sustaining valve, that is to say to operate to maintain a determined pressure on the upstream side and open to relieve the pressure on a determined amount being exceeded.

According to one specific aspect of the invention a piston, working in a cylinder open at one end to atmosphere and at the other end to the pressure to be controlled, is balanced by a spring or equivalent means, and is connected to a valve which controls the action of pressure fluid on the two sides of a piston connected to or constituting operating means for the main valve or plunger.

The valve operated by the balanced piston may either be one designed to admit pressure fluid to one side of the actuating piston and simultaneously to open up the opposite side to exhaust, or it may be in the form of a needle valve controlling exhaust of fluid from one side of an actuating piston, both sides of which are acted upon by a suitable pressure liquid supply.

In the former case, means are preferably provided to restore the control means, after any movement of the plunger or main valve, to the position occupied before the movement occurred, so that the plunger or main valve will remain in its new position until a further movement is called for by further variation in the pressure to be controlled. In the latter case, no restoring means are necessary.

The accompanying drawings illustrate, at Fig. 1, an embodiment of one form of the invention applied to the control of a pressure-sustaining valve of the plunger type.

Fig. 2 illustrates an embodiment of the type in which the balance lever actuates a needle valve controlling exhaust of fluid from one side of an actuating piston.

Referring firstly to Fig. 1, $a$ represents the casing of a valve of plunger type, $b$ a shaft extending to the interior of the plunger and carrying, in known manner, a pinion meshing with a rack on the stem of a pilot valve controlling an opening in the plunger nose. Externally of the casing, the shaft $b$ carries a pinion $c$ adapted to be rotated by means of a rack $d$. This rack $d$ is carried by the stem $e'$ of a piston $e$ working in a cylinder $f$. Either end of this cylinder may be supplied with pressure liquid, or be connected to exhaust by means of a cylinder control valve comprising a cylinder $g$ having working within it a piston $g'$ with a central annulus $g^2$ continually open to a pressure liquid supply, in this instance taken from the upstream or inlet side of the valve through a pipe $h$. Ports $f'$ and $f^2$ connect the ends of cylinder $g$ with the ends of the actuating cylinder $f$. In its central or normal position, the piston $g$ blanks off both ports $f'$ and $f^2$, and when moved from this position the piston admits pressure liquid to one end of the actuating cylinder $f$ and simultaneously opens up the other end of such cylinder to exhaust through one or the other or ports $i'$ and $i^2$ connected in this instance to a common pipe $i^3$ leading to the pipe line on the downstream side of the valve.

Pivotally connected at $j'$ to the stem of the piston $e$ is one end of a restoring lever $j$, mounted between its ends on a fixed pivot $j^2$ and having pivotally connected to its other end at $j^3$ one end of a rod or link $k$ whose other end forms a pivotal mounting at $k'$ for a balance lever $l$. This lever is pivotally connected at $l'$ to the stem of the control piston $g$, and at $l^2$ to the rod $m'$ of a piston $m$ working in a cylinder $n$, the upper end of which is open to the atmosphere whilst its lower end is open, through cock $n'$ and pipe $n^2$, to the pressure on the inlet side of the valve. A spring $o$ and weights $p$ enable the piston $m$ and lever $l$ to be balanced against an inlet pressure of any desired amount.

If the inlet pressure, that is to say the pressure in the pipe line above the valve, should rise above the determined point, the piston $m$ will be raised in its cylinder and will rock the lever $l$ about the point $k'$ of its pivotal connection to the rod or link $k$, which point at this time is fixed by reason of the stationary position of the plunger. The rocking of lever $l$ raises the control piston $g$ and causes pressure fluid to be admitted below the actuating piston $e$ and the upper side of said piston to be connected to exhaust. The piston $e$ is thus raised, and by rack $d$ and pinion $c$ rotates shaft $b$, such rotation giving to the internal pilot valve, through the internal pinion and rack, such a movement as brings about an opening movement of the main valve to lower the pressure in the pipe line upstream of the valve. The movement of the piston $e$, however, causes the restoring lever $j$ to be rocked, and this rocking movement, through rod or link $k$ causes the balance lever $l$ to pivot about the point $l^2$ and to carry the control piston $g$ back to the central or neutral position, so that the plunger or main valve remains in its new position.

It will be apparent that by arranging for the downstream pressure to act beneath the piston $m$ to support same against the action of an appropriate load on lever $l$, the control means will function to maintain a determined pressure in the pipe line below the valve, any drop below such pressure permitting the piston $m$ to drop and, by the consequent rocking of the lever $l$, operating the control valve to bring about an opening movement of the main valve. In this case, the rack $d$ would be on the opposite side of pinion $c$ so that rotation of the latter in a valve opening direction would be effected by a downward movement of the actuating piston.

With mechanism as described above, the valve plunger will respond immediately to any variation in the upstream or downstream pressure, as the case may be, since any movement of piston $m$ causes a corresponding movement of the control piston $g$ and a proportionate opening or closing movement of the valve plunger, and by providing the restoring lever $j$ and mounting the lever $l$ on a floating pivot in the manner described, and causing thereby restoration of the control piston $g$ to initial or neutral position after a plunger movement, no oscillation or surging of the plunger will occur in establishing or bringing it to rest in a new position.

Referring now to the form of construction shown at Fig. 2, which shows a pressure-reducing valve, both ends of the actuating cylinder $f$ are placed in communication with a pressure liquid supply, in this instance taken from the pipe line upstream of the valve through a pipe $q$. The side of the actuating piston $e$ remote from the stem $e'$ has a tubular extension $e^2$ passing slidably through the end of the cylinder $f$, ports $e^3$ admitting fluid to the bore of the tubular extension. The extension is of such smaller area than the piston rod $e'$ as to provide on its side of the piston $e$ an unbalanced area of sufficient extent to enable the pressure liquid acting thereon to move the piston in a downward or valve-closing direction when the bore of the extension is closed. A sliding or needle cylinder control valve $r$, the stem $r'$ of which is pivotally connected at $r^2$ with the balance piston $m$ is arranged to control the open end of the bore of the tubular extension.

The piston $m$ is arranged to be acted upon on its underside by the downstream or reduced pressure, and the balance lever $l$ is, in this embodiment, mounted on a fixed pivot $l^3$ between its ends.

The end of the tubular extension $e^2$ projects into a chamber $s$ co-axial with the actuating cylinder $f$ and having an outlet $s'$ leading to a low pressure zone, through a pipe $s^2$.

The arrangement is such that so long as the reduced pressure is maintained at the desired amount, its action upon the indicating piston $m$ causes the valve $r$ to hold the bore of the tubular extension $e^2$ open just sufficiently to maintain the loads on the two sides of the actuating piston in balance.

If the reduced pressure falls, the spring and weights acting on the lever $l$ act to force down the piston $m$ and the valve $r$ is caused to open up still further the bore of the tubular extension $e^2$, thus permitting of more rapid escape of pressure liquid through the bore to the zone of reduced pressure. An unbalanced pressure area is thus created on the upper side of the piston $e$, and the pressure liquid acting upon its under side is permitted to raise it and thereby to cause rotation of pinion $c$ in a valve-opening direction.

The extent of opening movement given to the valve, however, is determined absolutely by the extent of movement of the indicating piston $m$, since the actuating piston by its valve opening movement causes the end of the tubular extension $e^2$ to follow up the valve $r$ and the latter, as the end of the tubular extension approaches it, commences to throttle the bore and reduces gradually the movement of the actuating piston, finally bringing it to rest when the throttling of the bore has reached the point at which the pressure loads on the two sides of the actuating piston are balanced.

As the pressure on the outlet side of the main valve approaches the normal, the piston $m$ is raised and causes the valve $r$ to close completely the bore of the tubular extension $e^2$. The balance of pressure is thus transferred to the upper side of the actuating piston and it commences to move downwardly or in a valve-closing direction.

The piston $m$ causes the valve $r$ to follow up the movement of the actuating piston under the action of the restored reduced pressure, so that the actuating piston is slowly moved back to and brought to rest in the required position of closing.

The action of the reduced pressure upon the indicating piston may, instead of being direct as shown, be applied through the agency of a float and lever or equivalent means.

In the case of a plunger valve in which plunger movement is effected by the admission or exhaust of pressure liquid to or from an annular chamber surrounding the plunger, the actuating piston may be dispensed with and the ports $f'$ and $f^2$ of the control cylinder $g$, of the Fig. 1 arrangement be in communication respectively with the interior of the hollow plunger and with said annular chamber, and the plunger may have connected to it a rod extending to the exterior of the casing for connection to the restoring lever $j$. Also, in the case of a plunger valve such as just referred to, the rod of the actuating piston of either the Fig. 1 or Fig. 2 arrangement may be arranged to operate a cock or valve controlling admission of pressure fluid to and its exhaust from the interior of the hollow plunger and the annular operating chamber.

Although the improved control means have been described in connection with, and have been principally designed for application to, valves of the plunger type, it will be understood that their application is not so limited and that they may be employed in connection with valves of other descriptions.

While the foregoing describes various forms which my invention may assume, it will, of course, be understood that other modifications thereof or changes therein may be made without departing from the spirit of the invention as set forth in the appended claims.

I claim:

1. The combination with a valve mechanism having inner and outer casings spaced to form a relatively smooth annular passageway therebetween and a plunger cooperating with said inner casing to form a fluid chamber adapted to permit a controlling effect upon the plunger, said valve being disposable in a pipe line, of means for controlling plunger movements, including piston and cylinder elements one of which is movable, means for mechanically connecting the movable element to the plunger, valvular means for controlling fluid flow relative to the cylinder so as to effect throttling positions of the plunger automatically in accordance with pressure fluctuations in the pipe line, and restoring mechanism between said plunger and valvular means.

2. The combination with a valve mechanism having inner and outer casings spaced to form a relatively smooth annular fluid passageway therebetween, a plunger cooperating with the inner casing to form a fluid chamber adapted to permit a controlling effect upon the plunger, and means including a valve controlled orifice in the nose of said plunger permitting fluid communication between said chamber and the downstream side of a pipe line with which said valve mechanism is adapted to be associated, of means for controlling plunger movements including piston and cylinder elements, one of which is movable, means whereby said movable element controls said plunger nose valve thereby to control communication between the chamber and downstream pipe, means for controlling fluid flow relative to the cylinder, so as to effect different set throttling positions of the plunger automatically in accordance with pressure fluctuations in the pipe line, and restoring mechanism connected to and operated upon movement of said plunger nose valve whereby relative movement is permitted between said nose valve and the plunger before restoring action takes place.

3. The combination with a valve mechanism having inner and outer casings spaced to form a relatively smooth annular passageway therebetween and a plunger cooperating with said inner casing to form a fluid chamber adapted to permit a controlling effect upon the plunger, said valve being disposable in a pipe line, of means for controlling plunger movements, including piston and cylinder elements separate from said plunger, means for mechanically connecting the same thereto, and means for effecting variable throttling positions of the plunger, including means for controlling discharge of actuating fluid in the cylinder element automatically in accordance with pressure conditions in the pipe line, and a restoring mechanism associated with said plunger and discharge controlling means.

4. The combination with a valve mechanism of the plunger type disposable in a pipe line, of means for controlling plunger movements, including an orifice in said plunger, a valve movable with and relative to said plunger for controlling said orifice, piston and cylinder elements separate from said plunger, means for mechanically operatively connecting one of said elements to said plunger, and means for effecting variable throttling positions of the plunger, including cylinder control valve means for controlling discharge of actuating fluid in the cylinder element automatically in accordance with pressure conditions in the pipe line, said piston having differential areas, and restoring mechanism connected to said valve which controls said plunger orifice.

5. The combination with a valve mechanism of the fluid operated plunger type disposable in a pipe line, of means for controlling plunger movements, including fluid actuated piston and cylinder elements operatively connected to the plunger, and means for controlling fluid flow to said elements and plunger to effect different throttling positions of the plunger automatically in accordance with pressure conditions in the pipe line, said latter means including a pilot valve carried by said plunger and movable relative thereto and being adapted to be moved to different positions, whereby said plunger is adapted to follow the movement of said pilot valve to its different positions without overrunning the same, thereby to effect different throttling positions, and said pilot valve being movable automatically in accordance with the pressure conditions.

6. The combination with a valve mechanism having inner and outer casings spaced to form a relatively smooth annular passageway therebetween and a plunger cooperating with said inner casing to form a fluid chamber adapted to permit a controlling effect upon the plunger, said valve being disposable in a pipe line, of means for effecting variable throttling positions of the plunger, including an orifice in said plunger, a pilot valve for controlling said orifice movable with and relative to said plunger, and piston and cylinder elements operatively connected to the plunger for moving the same in opposite directions by fluid pressure, a valve for controlling fluid flow relative to said cylinder, and a fluid actuated motor for controlling said cylinder control valve, said motor being actuated automatically in accordance with pressure conditions in the pipe line so as to variably control the pilot valve, thereby effecting the throttling positions, and restoring mechanism between said pilot valve and orifice controlling valve.

7. The combination with a valve mechanism adapted to be interposed between up and downstream pipes and having inner and outer casings spaced to form a relatively smooth annular fluid passageway therebetween, a movable plunger cooperating with the inner casing to form a fluid chamber adapted to permit a controlling effect upon the plunger, a plunger pilot valve disposed therein and movable therewith and relative thereto and adapted to control communication between said chamber and the downstream portion of said pipe line, and means for controlling said plunger pilot valve, including fluid actuated piston and cylinder elements, one of which is movable, and operatively connected to said plunger and pilot valve, fluid-operated means for controlling flow of actuating fluid relative to said cylinder automatically in accordance with pressure conditions in said pipe line, said fluid operated means being adapted when in a position intermediate its extreme positions to effect a predetermined intermediate throttling position of the plunger, and restoring mechanism between said pilot valve and orifice controlling valve.

8. The combination with a valve mechanism disposable in a pipe line, of means for effecting different throttling positions of the valve, including piston and cylinder elements, one of which is moved in opposite directions by fluid pressure, and means for controlling fluid flow to the cylinder element automatically in accordance with the degrees of pressure in the upstream pipe, said latter means including restoring mechanism actuated in accordance with valve movements.

9. The combination with a valve mechanism disposable between up and downstream pipes, said valve mechanism comprising inner and outer casings spaced to form a relatively smooth fluid passageway therebetween and a plunger valve cooperating with said inner casing to form a fluid operating chamber, of means for moving the valve to different throttling positions, including piston and cylinder elements one of which is moved in opposite directions by fluid pressure, and means for controlling the actuating fluid to said cylinder so as to move the valve in an opening direction automatically when pressure in the upstream pipe decreases, said latter means including restoring mechanism actuated in accordance with valve movement.

10. The combination with a valve mechanism disposable between up and downstream pipes, said valve mechanism comprising inner and outer casings spaced to form a relatively smooth fluid passageway therebetween and a plunger valve cooperating with said inner casing to form a fluid operating chamber, of means for moving the valve to different throttling positions, including piston and cylinder elements one of which is moved in opposite directions by fluid pressure, and means for controlling the actuating fluid to said cylinder so as to move the valve in a closing direction automatically when pressure in the upstream pipe increases, said latter means including restoring mechanism actuated in accordance with valve movement.

11. The combination with a conduit valve mechanism disposable between up and downstream pipes, said valve mechanism comprising inner and outer casings spaced to form a relatively smooth fluid passageway therebetween and a plunger valve coperating with said inner casing to form a fluid operating chamber, of means for moving the valve to different throttling positions, including an orifice in said plunger, a valve movable with and relative to said plunger for controlling said orifice, piston and cylinder elements one of which is moved in opposite directions by fluid pressure, and cylinder control valve means for controlling the actuating fluid to said cylinder so as to move the conduit valve in a closing direction automatically when pressure in the upstream pipe decreases, and for moving the conduit valve in an opening direction automatically in accordance with an increase of pressure in the upstream pipe, and restoring mechanism connecting said cylinder control valve and orifice controlling valve.

12. The combination with a valve mechanism disposable in a pipe line, of means for moving the valve to different fixed throttling positions by power automatically in accordance with pressure conditions in the pipe line, and means for controlling the power therefor, including piston and cylinder elements, one end of said cylinder having atmospheric communication, while the other end is subjected to fluid pressure, and restoring mechanism adapted to control valve movements and actuated directly by one of said elements upon movement thereof.

13. The combination with a valve mechanism disposable in a pipe line, of actuating means for moving the valve to different fixed throttling positions by power automatically in accordance with pressure conditions in the pipe line, and means for controlling power thereto, including piston and cylinder elements, one end of said cylinder having atmospheric communication, means for connecting the other end of the cylinder to the pipe line whereby pressure variations therein will move the piston to vary the power flow to the valve actuating means, and restoring mechanism associated with said piston.

14. The combination with a valve mechanism interposed between up and downstream pipes of a flow conduit, of means for effecting different throttling positions of the valve automatically in accordance with pressure conditions in said conduit, said means including power actuating piston and cylinder elements, one of which is moved in opposite directions by fluid pressure, a valve for controlling fluid flow to said cylinder, means for controlling said control valve automatically in accordance with pressure conditions, and a restoring mechanism associated with said control valve and power actuating elements.

15. The combination with a valve mechanism interposed between up and downstream pipes of a flow conduit, of means for effecting different throttling positions of the valve automatically in accordance with pressure conditions in said conduit, said means including piston and cylinder elements, one of which is moved in opposite directions by fluid pressure, a valve for controlling fluid flow to said cylinder, means for controlling said control valve automatically in accordance with pressure conditions, and restoring mechanism operatively connected to said control valve and said movable element.

16. The combination in a valve mechanism adapted to be disposed in a conduit, comprising a movable conduit valve member, means for controlling movement thereof including an orifice in said conduit valve communicating with said conduit, a pilot valve movable with and relative to said conduit valve for controlling the orifice therein, piston and cylinder elements one of which is movable, means for mechanically connecting said movable element to said conduit valve member through said pilot valve, valvular means for controlling fluid flow relative to said cylinder so as to effect throttling positions of said valve member automatically in accordance with pressure fluctuations in the conduit, and restoring mechanism between said pilot valve and valvular means.

17. The combination, in a valve mechanism adapted to be disposed in a conduit, comprising inner and outer casings spaced to form a relatively smooth annular fluid passageway, a plunger associated with said inner casing to form an internal fluid chamber, an orifice in said plunger communicating with said conduit, a pilot valve for controlling said orifice adapted to move with or relative to said plunger, operating means for said plunger and pilot valve, and restoring mechanism between said pilot valve and operating means.

18. The combination, in a valve mechanism adapted to be disposed in a conduit, comprising inner and outer casings spaced to form a relatively smooth annular fluid passageway, a plunger associated with said inner casing to form an internal fluid chamber, an orifice in said plunger communicating with said conduit, a pilot valve for controlling said orifice adapted to move with or relative to said plunger, fluid operated piston and cylinder elements adapted to move said plunger, and restoring mechanism, for controlling said elements, operatively connected to said pilot valve whereby operation of the restoring mechanism may be delayed after movement of said plunger.

19. The combination, in a valve mechanism for a conduit, comprising a valve casing, a movable valve member for controlling flow through the conduit, fluid operating means for said valve member, and restoring mechanism adapted to act upon said operating means and operated upon movement of said valve member, the operative connection between said restoring mechanism and valve member including means whereby the operation of the restoring mechanism is adapted to be delayed during certain movements of the valve member.

20. In combination, a pressure regulating valve mechanism disposed between up and downstream pipes of a hydraulic conduit for controlling fluid flow therethrough to regulate the conduit pressure, power means for actuating said valve mechanism, means for controlling said power means automatically in accordance with pressure variations in said conduit thereby to adjust said valve and control said pressure variations, and restoring mechnanism operative, upon valve movement, to control said automatic means and effect a relatively slow adjustment of said valve mechanism thereby to prevent hydraulic pressure surges in said conduit.

21. In combination, a valve mechanism disposed between up and downstream pipe of a hydraulic conduit for controlling fluid flow therethrough, means for actuating said valve mecahnism by hydraulic pressure, fluid pressure operated valvular means for controlling the operating fluid pressure on said actuating means, means for controlling said valvular means automatically in accordance with variations in conduit pressure from a predetermined value, thereby to adjust said valve and control said variations, and restoring mechanism adapted upon movement of said conduit valve to control said valvular means and effect a relatively slow adjustment of said conduit valve, thereby to prevent hydraulic pressure surges in said conduit.

22. In combination, a plunger type of valve mechanism disposed between up and downstream pipes of a hydraulic conduit for controlling fluid flow therethrough, means for moving the same in opposite directions by hydraulic pressure, valvular means for controlling the discharge of fluid pressure from said hydraulic moving means, means for controlling said valvular means automatically in accordance with pressure variations, from a predetermined value, in said conduit thereby to adjust said valve and control said variations, and restoring mechanism adapted upon movement of said conduit valve to control said valvular means and effect a relatively slow adjustment of said conduit valve thereby to prevent hydraulic pressure surges in said conduit.

23. In combination, a valve mechanism disposed between up and downstream pipes of a hydraulic conduit for controlling fluid flow therethrough, said valve mechanism having inner and outer casings spaced to form an annular fluid passageway therebetween and a plunger telescopically arranged with respect to said inner casing to form an internal fluid pressure operating chamber adapted to effect a fluid pressure force on the plunger in a closing direction, fluid pressure means for moving the plunger in the opening direction, fluid pressure operated valvular means for controlling the operating pressure for said internal chamber, means for controlling said valvular means automatically in accordance with pressure variations, from a predetermined value, in said conduit thereby to adjust said conduit valve and control said variations, and restoring mechanism adapted upon movement of said conduit valve to control said valvular means and effect a relatively slow adjustment of said conduit valve.

24. In combination a valve mechanism, disposed between up and downstream pipes of a hydraulic conduit for controlling fluid flow therethrough, power means for actuating said valve mechanism, means for controlling said power means automatically in accordance with pressure variations in said conduit thereby to adjust said conduit valve and control said variations, and restoring mechanism automatically operative, upon valve movement, to control said automatic means, said restoring mechanism including a member slidably supported for rectilinear movement cordance with pressure variations in said and operatively connected at one end to the movable element of the conduit valve mechanism and its other end to said means which controls said power means.

25. In combination a valve mechanism, disposed between up and downstream pipes of a hydraulic conduit for controlling fluid flow therethrough, power means for actuating said valve mechanism, means for controlling said power means automatically in accordance with pressure variations in said conduit thereby to adjust said valve and control said variations, and restoring mechanism automatically operative, upon valve movement, to control said automatic means, said restoring mechanism including a rack and pinion for effecting the necessary restoring movement.

26. In combination, a valve mechanism having inner and outer casings spaced to form a relatively smooth annular fluid passageway therebetween, a plunger telescopically arranged with respect to said inner casing, valvular means for controlling the operation of said plunger, and restoring mechanism for said valvular means having a rack and pinion one of which is operatively connected to said plunger.

27. In combination, a valve mechanism having inner and outer casings spaced to form a relatively smooth annular fluid passageway therebetween, a plunger telescopically arranged with respect to said inner casing, valvular means for controlling the operation of said plunger, and restoring mechanism for said valvular means, having a shaft extending laterally through said conduit valve mechanism and operatively connected at its inner end to said plunger whereby plunger movement effects rotation of said shaft, a pinion secured to the outer end of said shaft, a rack meshing with said pinion, and means for operatively connecting said rack and valvular means.

FREDRICK AUGUST KLOUMAN.

CERTIFICATE OF CORRECTION.

Patent No. 1,769,845.  Granted July 1, 1930, to

FREDRICK AUGUST KLOUMAN.

It is hereby certified that error appears in the printed specification of the above numbered patent requiring correction as follows: Page 6, line 95, claim 24, strike out "cordance with pressure variations in said"; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.

nism for said valvular means, having a shaft extending laterally through said conduit valve mechanism and operatively connected at its inner end to said plunger whereby plunger movement effects rotation of said shaft, a pinion secured to the outer end of said shaft, a rack meshing with said pinion, and means for operatively connecting said rack and valvular means.

FREDRICK AUGUST KLOUMAN.

CERTIFICATE OF CORRECTION.

Patent No. 1,769,845.                                  Granted July 1, 1930, to

FREDRICK AUGUST KLOUMAN.

It is hereby certified that error appears in the printed specification of the above numbered patent requiring correction as follows: Page 6, line 95, claim 24, strike out "cordance with pressure variations in said"; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.